United States Patent [19]
Downey

[11] 3,728,012
[45] Apr. 17, 1973

[54] EYEGLASSES WITH RETAINER

[76] Inventor: Dixon P. Downey, 2100 S. Ocean Lane, Fort Lauderdale, Fla. 33316

[22] Filed: Dec. 15, 1971

[21] Appl. No.: 208,155

[52] U.S. Cl..................................351/157, 351/123
[51] Int. Cl. ..............................................G02c 11/00
[58] Field of Search...............................351/157, 123

[56]        References Cited

UNITED STATES PATENTS 3,588,960   6/1971   McClellan............................351/157
2,965,099   12/1960  Aufricht................................351/157

Primary Examiner—Ronald L. Wibert
Assistant Examiner—Paul A. Sacher
Attorney—John H. Oltman et al.

[57]        ABSTRACT

Eyeglasses having a retainer which passes through openings in side portions of the eyeglasses and is adjustable longitudinally to retain the eyeglasses firmly at the eyes of a person are provided with an improved retainer having great springiness and a high coefficient of friction at its surface to cooperate with openings in the side portions of the eyeglasses which are only slightly larger than the diameter of the retainer for receiving the retainer snugly but slidably so that either end of the retainer may be pulled to tighten it on the head of the person. The great springiness and high friction characteristics of the retainer cause it to bind in the openings tending to keep it in the adjusted position. However, the retainer is releaseable for removal from the head of the person. In the preferred embodiment, the retainer is a plastic monofilament strand.

8 Claims, 3 Drawing Figures

PATENTED APR 17 1973  3,728,012

INVENTOR.
DIXON P. DOWNEY.

EYEGLASSES WITH RETAINER

BACKGROUND OF THE INVENTION

Eyeglasses having a retainer strand have been proposed previously, but adjustment of the strand has been too difficult to make the combination of retainer and eyeglasses function satisfactorily.

SUMMARY OF THE INVENTION

The present invention combines the improved characteristics of springiness and high coefficient of surface friction in a strand with a pair of eyeglasses to provide an adjustable retainer for the eyeglasses which, although extremely simple, functions in a highly satisfactory manner. The strand is preferably plastic monofilament, and the best results are obtained with a nylon plastic material.

It is an object of the present invention to provide an infinitely adjustable retainer strand combined with a pair of eyeglasses for retaining the eyeglasses on the head of a person but adjustable to allow the eyeglasses to be suspended from the neck of the person and rest on the chest of the person.

Another object of the invention is to provide a strand of improved characteristics so that the strand may be more quickly and easily adjusted than has been possible with known constructions.

Another object of the invention is to provide eyeglasses with a retainer which is inconspicuous, colorable, light weight, strong and durable.

Still another object of the invention is to reduce the cost of a combination eyeglass and retainer by simplifying the strand retainer and yet improving its operating characteristics.

Other objects of this invention will appear from the following description and appended claims, reference being had to the accompanying drawings forming a part of this specification wherein like reference characters designate corresponding parts in the several views.

Figure 1:
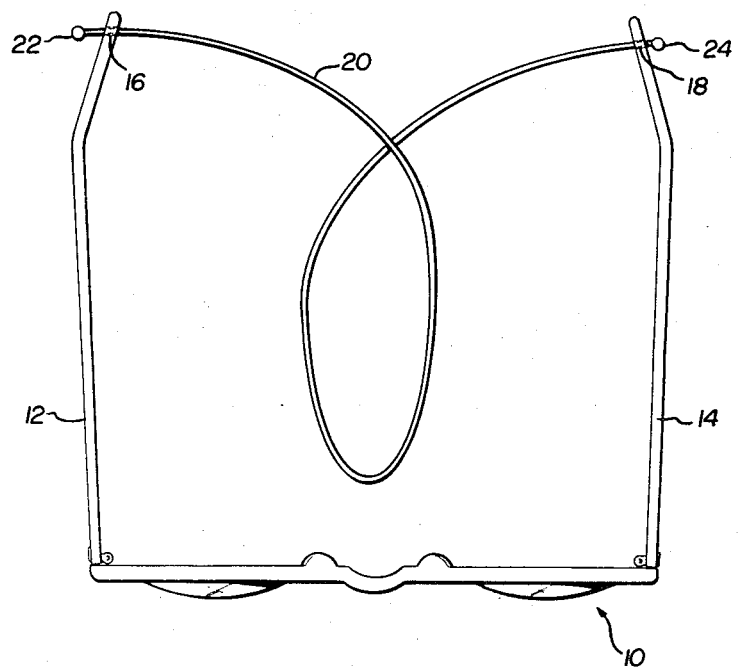
FIG. 1 is a plan view of a pair of eyeglasses with a retainer in accordance with one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The eyeglasses 10 are conventional. They may be spectacles, goggles, sunglasses, or any other type of eyeglasses. The eyeglasses 10 have side portions 12 and 14 which in this embodiment are temple members. It will be understood, however, that side portions other than temples could be used.

The side portions 12 and 14 have openings 16 and 18 respectively, the openings in this embodiment being located near the ends of the temples 12 and 14. The openings could be provided closer to the eyeglasses, or they could be located in the side portions of the eyeglasses to the left and right of the lenses.

A strand 20 passes through the openings 16 and 18. The strand 20 is adjustable longitudinally through the openings.

Figure 2:
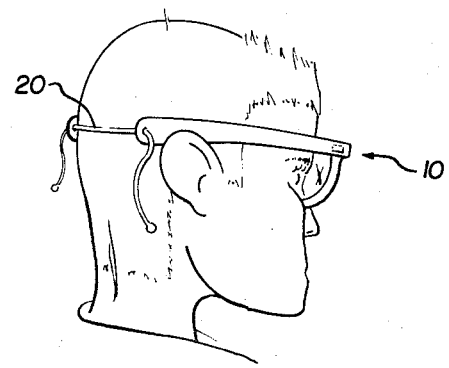
FIG. 2 shows the eyeglasses of FIG. 1 as they appear when worn by a person about his head.

The adjustment is carried out in the following manner. The retainer 20 is initially loose as in FIG. 1. The eyeglasses are placed on the head of the wearer in the position shown in FIG. 2. Then, one end or both ends of the strand 20 is pulled to tighten the strand 20 around the back of the head as shown in FIG. 2. Because of special characteristics of the strand, it tends to stay in whatever position it is adjusted to. These characteristics will be explained further. In order to remove the eyeglasses from the head of the wearer, one of the temple pieces is pulled away from the head, and this loosens the strand 20 sufficiently so that the glasses can be removed from the head of the wearer. The strand 20 can be pulled back to the position shown in FIG. 1. In this condition, the strand can be placed around the back of the neck of the person, and the eyeglasses 10 will hang down at the level of the chest of the person.

Figure 3:
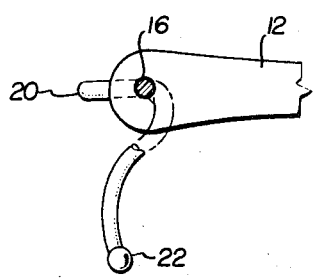
FIG. 3 is a fragmentary view showing a portion of the strand where it passes through a side portion on temple of the eyeglasses.

The strand has special characteristics which make this easy adjustment and operation possible. The strand is flexible, but has a high degree of springiness. Also, the strand has a high coefficient of friction at its surface where it cooperates with the openings 16 and 18 so that the strand tends to stay in whatever position it is adjusted to. As shown in FIG. 3, the strand 20 passes through the opening 16 at an angle or bias, and the springiness of the strand tends to wedge the strand in the opening 16 so that it cannot move easily. Also, the high coefficient of surface friction of the strand as it wedges against the edge at the opening tends to make the strand bind in the opening so that it stays in the adjusted position. The openings 16 and 18 are only slightly larger in diameter than the diameter of the strand, and this assures that the strand will have the proper binding action in the openings and yet be readily adjustable by applying force to the strand.

As previously mentioned, the best results have been obtained when the strand is made of plastic monofilament. It is believed that nylon material is critical for best results, but it is contemplated that an equivalent material could be used, such as polyethylene or other plastic materials of similar physical properties.

The strand 20 has enlarged knobs 22 and 24 at its ends, and these enlarged knobs prevent the strand from being pulled backward out of the openings 16 and 18. The knobs 22 and 24 are formed by melting or fusing and then solidifying of the ends of the strand, and since the strand is nylon plastic monofilament, the enlargement can be accomplished simply by heating the ends of the strand with a match after the strand is in position on the eyeglasses as shown in FIG. 1. In assembling the retainer with the eyeglasses, it is only necessary to drill holes in the temples, pass the strand through the holes, and fuse the ends of the strands to form the knobs 22 and 24.

The invention has a number of advantages. The plastic monofilament is not absorbent, and so is not affected by perspiration, hair treatments, water and the like. There is no metal to corrode, and nothing to mark or soil clothing. The strand is easily washed with soap and water. There are no protrusions which could easily catch dirt.

The combination strand and eyeglasses is very inexpensive. The strand itself costs only a fraction of a cent, and the labor cost involved in assembling the invention is also small.

The strand is extremely strong. For example, one-sixteenth inch monofilament with the proper characteristics of springiness and coefficient of friction has a rated breaking strength of over 100 pounds.

The strand is infinitely adjustable throughout its length, and can be adjusted to any setting by a simple motion with either hand. As previously explained, the strand stays in place due to cooperation between the sizes of the opening and the strand, the coefficient of friction of the surface of the strand and the springiness of the strand. In a practical embodiment, the strand may have a diameter of one-sixteenth of an inch and the openings 16 and 18 may have a diameter of five sixty-fourths of an inch. However, other specific sizes may be used so long as the sizes of the opening and the strand are close together, say within one sixty-fourth of an inch for a 1/16 inch strand and a scaled distance for other sizes. The strand has a length of from 2½ to 3 times the direct distance between the side portions or temples or other appropriate length.

The strand is very durable. Nylon monofilament exhibits almost no fatigue or loss of strength over time for any commonly encountered cause. Use of the eyeglasses and retainer over a long period of time does not increase the hole size appreciably. Ordinarily, the strand will outlast the frame of the eyeglasses. The strand adds almost no weight to the eyeglasses. The strand is inconspicuous. Preferably, the strand is transparent or transluscent. It may be tinted or dyed to remain transparent or transluscent but have a characteristic color as desired. The color may be the same as the color of the hair of the wearer to make the strand even more inconspicuous.

When the eyeglasses are hanging from the neck of the person, they are in position for instant use, and they cannot be easily lost or misplaced. When the eyeglasses have been placed on the head of the user and the strand adjusted to tighten it, the eyeglasses cannot readily fall off the face of the person even if the person perspires making the strand slippery or moves about with normal effort. The strand serves a further purpose in holding the hair of the user in position which may be important, for example, in athletics. Also, cosmetic trinkets or beads might be threaded on the strand to serve as adornment for use by ladies. Such beads might take up only the width of the frame and would need to be placed only between the side portions of the eyeglasses. The ends of the strand curl down out of the way due to the natural tendency of the springy material to curl.

The invention may be applied in ordinary spectacles, goggles, sunglasses and the like. The combination could be sold as a kit to be assembled and installed by the user.

Having thus described my invention, I claim:

1. In a combination pair of eyeglasses and retainer wherein the eyeglasses have side portions each having an opening therein through which a strand passes, the strand being adjustable longitudinally of the strand and transversely relative to said side portions so as to be worn snugly around the back of the head of a person to retain the eyeglasses firmly at the eyes of the person, the improvement wherein said strand comprises a continuous plastic filament extending through both of said openings and having great springiness and a high coefficient of friction at its surface, and at least one of said openings has only a slightly larger diameter than the diameter of said strand and receives said strand snugly with a friction fit but slidably so that said strand may be pulled through said one opening to tighten the same on the head of the person and the great springiness and high friction characteristics of said strand cause it to bind in said one opening tending to keep the same in the adjusted position, said strand being adjustable to release the same from the head of the wearer by pulling on the eyeglasses, and the ends of said strand having enlarged fused portions to prevent the same from slipping out of said openings.

2. The improvement as claimed in claim 1 wherein said strand is translucent.

3. The improvement as claimed in claim 2 wherein said strand is colored.

4. The improvement as claimed in claim 1 in which said strand comprises plastic monofilament.

5. The improvement as claimed in claim 4 in which said monofilament consists of nylon.

6. The improvement as claimed in claim 1 in which said strand has a length in the range from 21/2 to 3 times greater than the direct distance between said side portions.

7. In a combination pair of eyeglasses and retainer wherein the eyeglasses have side portions each having an opening therein through which a strand passes, the strand being movable longitudinally of the strand and transversely relative to said side portions so as to be worn snugly around the back of the head of a person and being movable to extend said strand so that said strand can be worn at the neck of the person with the eyeglasses hanging at the chest of the person, the improvement wherein said strand is a continuous plastic filament extending through both of said openings characterized by great springiness and a high coefficient of friction at its surface, and each of said openings is only slightly larger than the diameter of said strand and receives said strand at a bias with a friction fit but slidably so that either end of said strand may be pulled to tighten the same on the head of a person with the greater springiness and high friction characteristics of said strand causing it to bind in said openings to keep the same in the adjusted position, said strand consisting of a plastic monofilament having fused portions at the ends thereof providing enlargements for preventing said strand from slipping out of said openings.

8. The improvement as claimed in claim 9 in which said plastic monofilament comprises nylon.

* * * * *